Dec. 1, 1953  C. MINGIONE  2,660,797
REEL TIMER
Filed June 30, 1950  4 Sheets-Sheet 1
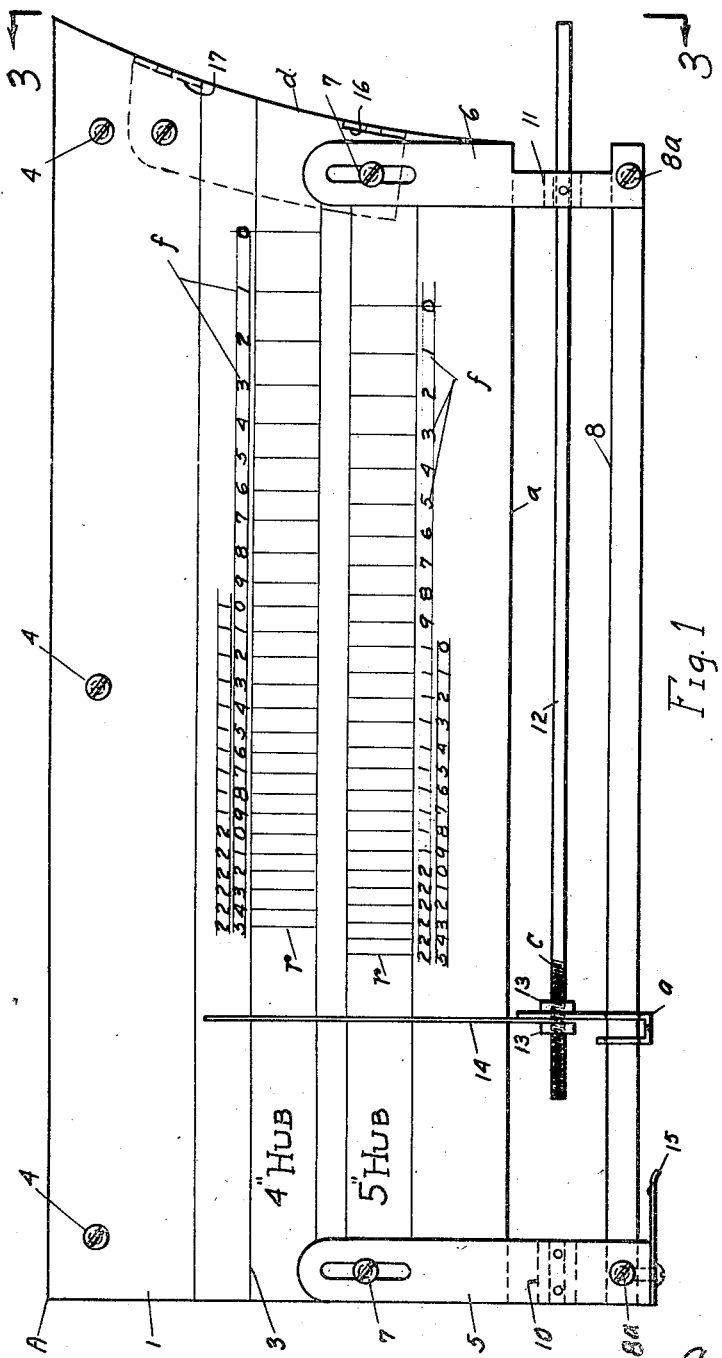
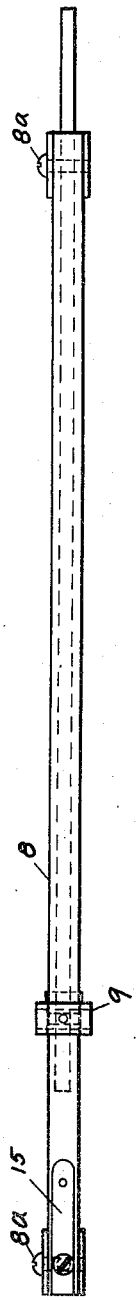
INVENTOR.
Carl Mingione
BY Myron J. Dikeman
ATTORNEY Dec. 1, 1953
C. MINGIONE
2,660,797
REEL TIMER
Filed June 30, 1950
4 Sheets—Sheet 2
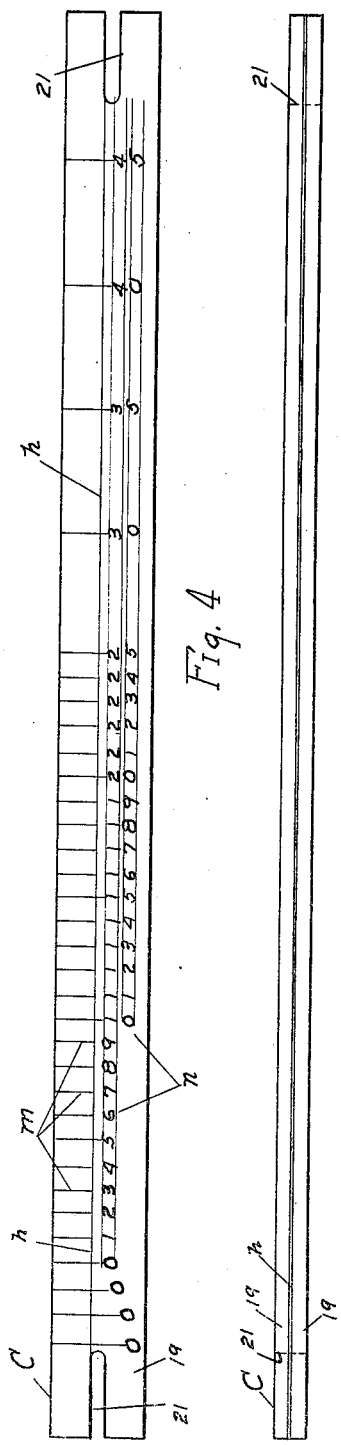
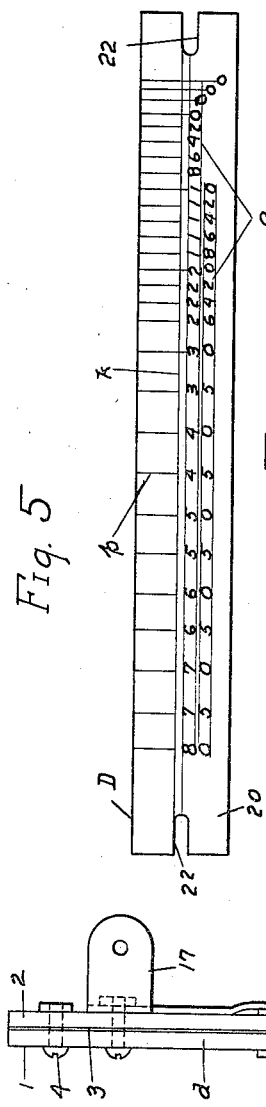
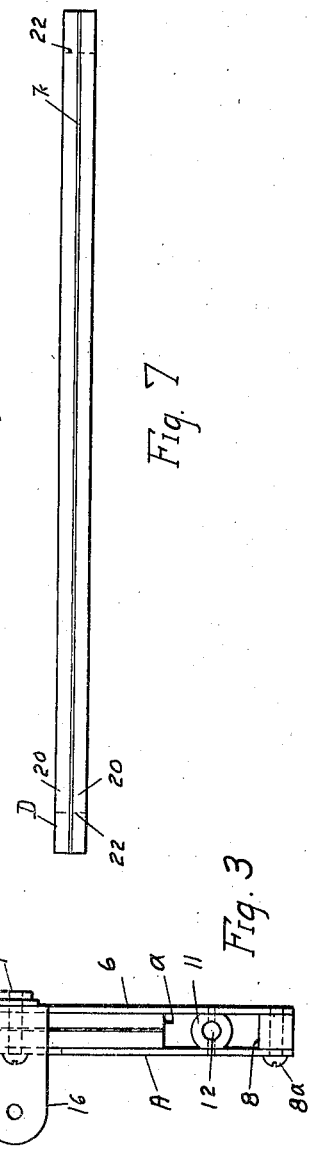
INVENTOR.
Carl Mingione
BY
Myron J. Dikeman
ATTORNEY

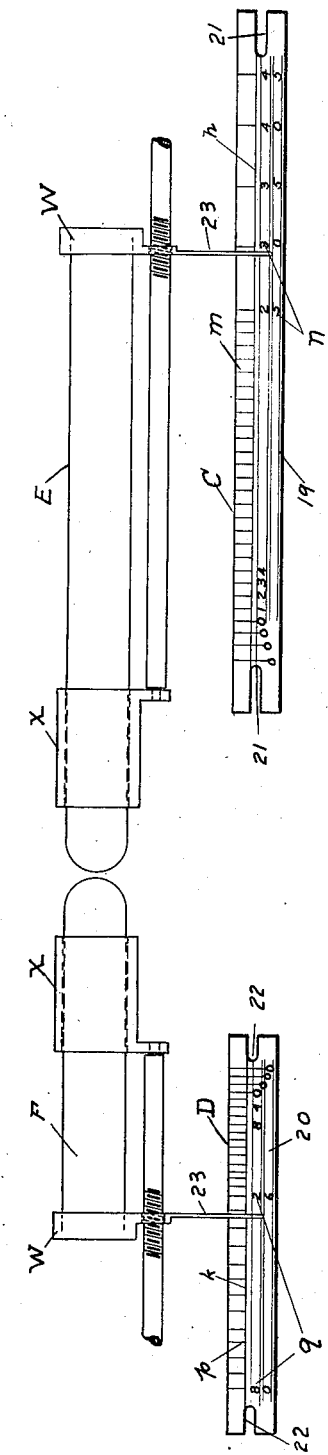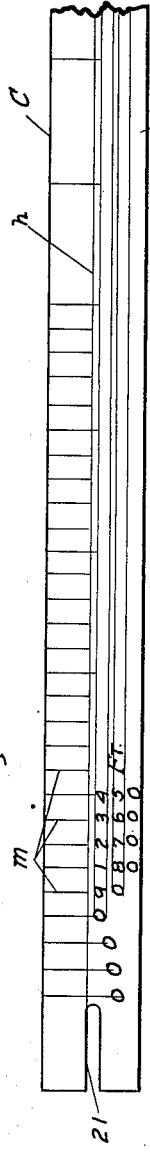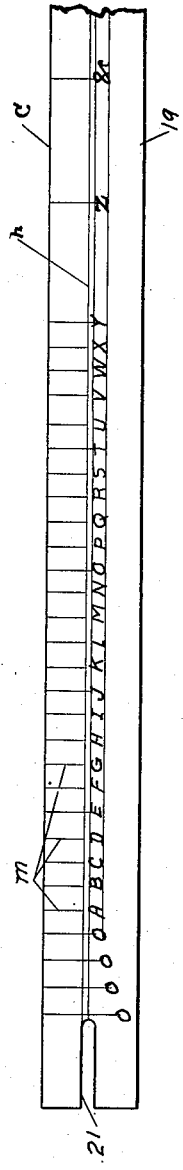

Patented Dec. 1, 1953

2,660,797

UNITED STATES PATENT OFFICE 2,660,797

REEL TIMER

Carl Mingione, Detroit, Mich.

Application June 30, 1950, Serial No. 171,461

1 Claim. (Cl. 33—169)

My invention relates to a timing unit for moving picture projector machine operations.

The object of my invention is to provide means for accurately determining the actual consumption time for light arc-carbon units, or sections thereof, as are used within picture projector machines.

Another object is to produce an indicator unit that will predetermine the actual operating time required for any chosen film reel.

A further object is to produce a carbon consumption indicator for measuring the comparative duration periods for both the positive and negative arc-carbon units, in terms of the chosen film reel duration.

These several objects are attained in the preferred form by the construction and arrangement of parts as are more fully hereinafter set forth.

Similar parts on all drawings are marked by similar numerals or letters.

Fig. 1 is a plan view of the film reel time indicator, showing the general arrangement of the various operating parts.

Fig. 2 is an edge view of the assembled unit showing the indicator slide bar and attached indicator means.

Fig. 3 is an end view of the film reel indicator, showing the relative position of the assembled operative units, and attaching means for the reel magazine.

Fig. 4 is a plan view of the positive arc-carbon indicator, showing the time graduations and means for mounting the unit on projector machine supports.

Fig. 5 is an edge view of the assembled indicator in the Fig. 4, showing the general construction of the transparent means for retaining the indicator graduations therein.

Fig. 6 is a plan view of the negative arc-carbon indicator, also showing the time graduations, and means for mounting same.

Fig. 7 is an edge view of the Fig. 6, showing the assembled formation.

Fig. 9 is an illustrative elevation of both the positive and negative light arc-carbon as mounted within a projector machine, showing the respective carbon consumption indicators and the connected operating units as mounted thereon, also for indicating the actual consumption of the respective arc-carbon stubs.

Figs. 10 and 11 are modified elevation views of the former positive arc-carbon indicator shown in the Fig. 4, illustrating modified duration characters as may be applied to the respective indicator scales, and reel timer.

Figure 8:
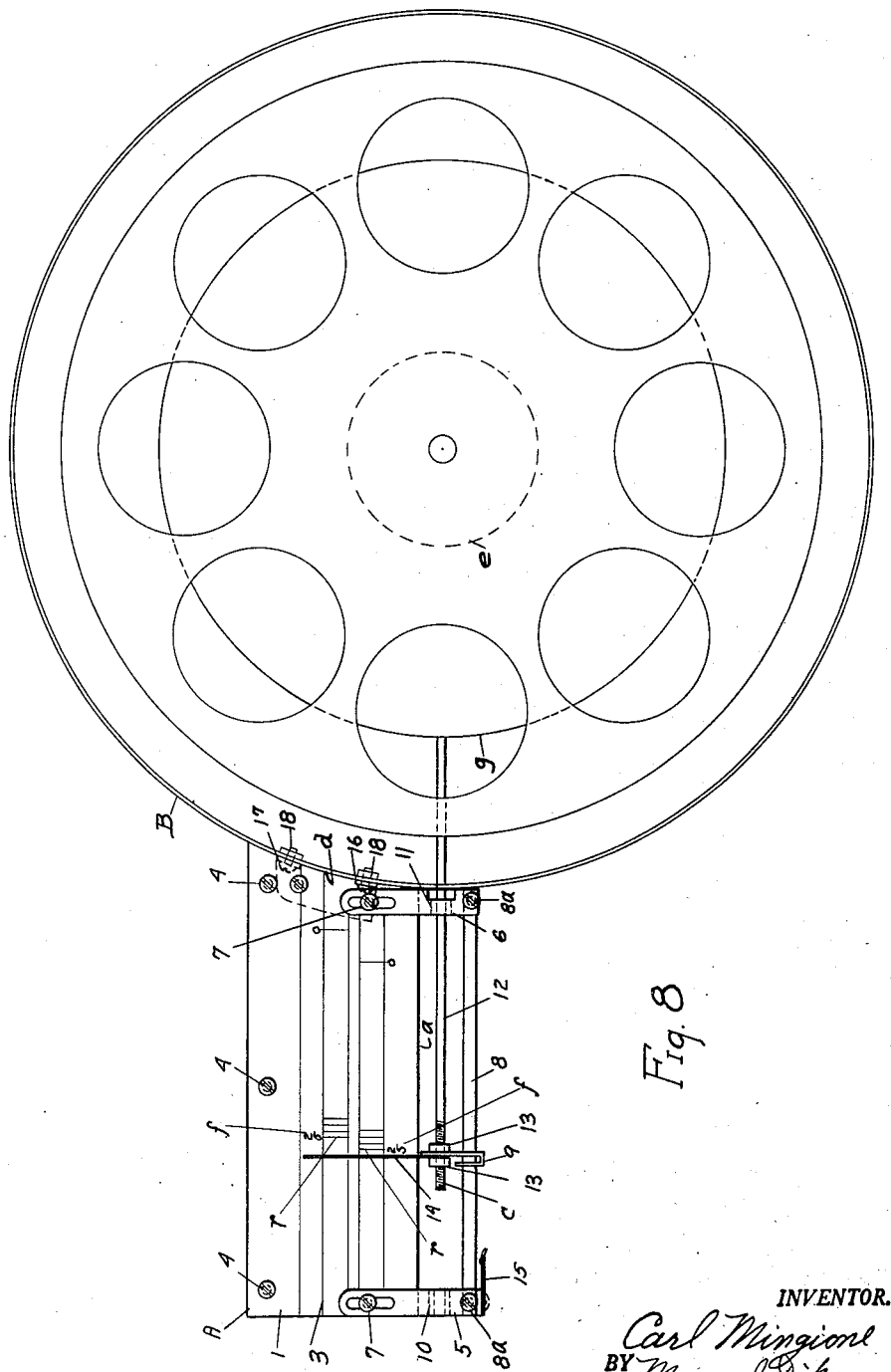
Fig. 8 is a plan view illustrating an assembled film reel indicator unit as mounted on an upper reel magazine of a projector machine, positioned for indicating the required time for the projector exposure.

I will now describe more fully the detailed construction of my device, referring to the drawings and the marks thereon.

It is known that the moving picture projector machines now in common use are designed for receiving rotatably mounted film reels thereon, which are reflected through special projector lens by means of powerful arc-carbon lights, of standard design. The arc-carbon units comprise a positive and a negative carbon elements E and F, usually mounted within adjustable slide supports X, positioned in alignment so the adjacent carbon ends may be adjusted to predetermined spacings as an electric current is passed therethrough. Both carbon units being illustrated as automatically adjusted by special projector operating mechanism Y and Z, operatively connected to the respective arc-carbon unit caps W, as is illustrated in the Fig. 9 of the drawings. The positive arc-carbon unit being consumed much faster than the negative unit, requires a unit of a greater length for uniform consumption.

It is known by picture projector operators that film reels vary in length according to the actual film exposure, and therefore require different time lengths for projector reproduction; and that the rapidly consumed arc-carbon units must be of sufficient length to continue said film reel projection without interruption, or break therein. Further, that projector machines often retain unused sections of arc-carbon which may, or may not, be of sufficient length for the following film reel, but which is easily and accurately determined by my new consumption indicator and reel timer, and without removing any parts from the projector.

In general, my invention is a special attachment for film reel projector machines, comprising a reel timer indicator A for predetermining the time duration of any chosen reel, together with special arc-carbon consumption indicators C and D, for predetermining the duration of both the positive and negative light carbon units mounted within the projector, and for synchronizing the time operations of all units.

The film reel indicator A frame is preferably made of two thin sheets 1 and 2 of transparent material, such as plastic or like material, and carries mounted therebetween a thin, graduated, time indicator sheet 3, tightly clamped therein by means of screws 4 or other suitable means. Along one side $a$ of the reel indicator frame A, at opposite ends thereof, are mounted double, adjustable, frame yokes 5 and 6 positioned at right angles to the edge $a$ and projected outward therefrom, said frame yokes being retained fixedly in their adjusted positions, by special clamp screws 7. Within the outer projected ends of said frames 5 and 6, is mounted a slide bar 8, preferably rectangular in cross-section, positioned parallel with said frame edge $a$, and fixedly clamped therein by screws 8a. Slidably mounted over the bar 8 is an adjustable indicator frame 9, designed to project across the open space between said bar and the frame edge $a$ and carries an extended indicator needle 14 fixedly mounted therein and projected therefrom to extend over the frame A upper surface, at right angles to the frame side $a$. The frame 9 is adjustable along the slide bar 8 nearly the full length thereof within the frame yokes 5 and 6. Positioned centrally between the frame side $a$ and the slide 8, and parallel therewith, are fixedly mounted slide bearings 10 and 11, and which receives therein an adjustable indicator rod 12. Said indicator rod 12 is formed with a threaded end section $c$ mounted through a central recess formed in the indicator frame 9, and is fixedly clamped thereto by the lock nuts 13. The frame 9 and attached indicator needle 14 are displaced directly with the indicator rod 12, moving said needle 14 along the graduated indicator sheet 3 for the full length thereof. The indicator rod 12 is designed and positioned to slide within the bearing 11, projecting from frame A end a pre-determined distance, and when not in use, it may be displaced to a closed position within the bearing 10, and is fixedly retained by a spring lock catch 15 designed to engage therewith. The opposite frame A end is designed with a curved end wall $d$, formed to fit and engage a picture projector film reel magazine B, positioned with the indicator rod 12 on a radial line through the magazine center, and is securely attached to said magazine walls by special bracket members 16 and 17, by suitable bolts 18, or by any other suitable means, as illustrated in the Fig. 8 of the drawings. The indicator rod 12 is displaced through the magazine wall side opening, directly opposite the upper reel magazine compartment, and adjusted therein to contact the film reel hub center $e$, and the needle 14 adjusted to the zero point on the graduated indicator sheet 3, designed to engage and measure the operation duration, of any reel film as may be wound thereon. The standard reel hubs $e$ are usually made either four, or five, inches in diameter. The graduated time indicator sheet 3 is designed with a series of parallel lines $r$, for both the four and five inch reel hubs, each graduation line $r$ indicating a pre-determined number of feet of film as may be rolled on the respective reel hub $e$, herein graduated as ninety feet, and which in ordinary projector machines require approximately one minute of time for projection exposure, and the graduation numerals $f$ are placed opposite the consecutive graduation lines on the indicator sheet 3, representing the actual time in minutes, for comparative film reel projection exposures, and as indicated by the needle 14 when said slide rod 12 is displaced within the magazine chamber to the reel film surface $g$ as may be then wound on the reel central hub $e$, either the four, or the five inch, hub, as the case may be, and as indicated in the Fig. 8 of the drawings.

The carbon consumption indicator is formed of two sections C and D, designed separately for both the positive and the negative arc-carbon light units, and are preferably formed of two thin sheet strips 19 and 20, of some suitable transparent material, such as plastic as in the film reel indicator, and carry graduated time indicator sheets $h$ and $k$ mounted therebetween, said sheet sections being retained united by cementing the respective sheets together, or by suitable bolts, as may be desired. The positive carbon consumption indicator C is of a greater length than the negative unit D, corresponding to the respective arc-carbon unit lengths. The graduations $m$ of the positive indicator unit C, are spaced to represent the actual consumption time, by one minute spaces, for the connected positive arc-carbon unit E as indicated by the adjoining numerals $n$. The corresponding graduation lines $p$ of the negative arc-carbon unit D are designed to two minute spaces, and as represented by the adjoining numerals $q$. The dual indicator sections C and D are each formed with end slots 21 and 22, respectively, providing means for fixedly attaching said graduated indicator units on the picture projector machine, directly opposite the corresponding positive and negative arc-carbon units E and F, and as indicated in the Fig. 9 of the drawings, and adjusted thereon to the carbon end cap indicator needles 23, positioned to coincide with the graduated indicator "zero" point, for the minimum carbon stub operation. Both graduated carbon consumption indicators E and F are provided with at least three "zero" points, provided for varying carbon pre-arcing during normal pre-heating of the lighting unit, and which may be variable for different grades of carbon, or different electric currents used therewith. The reading on the respective indicator graduations represent the actual consumption time of the respective remaining carbon stubs.

The actual duration graduations of both the film reel and the arc-carbon consumption indicators, may also be represented by "feet," or by "symbols," as is illustrated in the Figs. 10 and 11 of the drawings, so long as each space represents comparative consumption periods of the film duration, on all of the respective indicators.

In installing and operating my device, the carbon consumption indicators C and D are fixedly attached to the projector machine frame members, positioned directly opposite the respective arc-carbon units E and F, by suitable attaching means as may be mounted through the end slots 21 and 22, and thereon adjusted with their "zero" graduation points opposite the respective indicator needles 23 when displaced to the minimum carbon stub usable therein. The film reel indicator A is fixedly attached to the projector upper reel magazine as previously described. For determining if the remaining projector arc-carbon stubs E and F are sufficient for complete operation of a chosen film reel as may be mounted within the projector upper magazine, the indicator rod 12 is ejected within the reel chamber until contacted with the film surface as may be wound on said reel. The reading of the indicator needle 14, either for the four, or the five inch hubs as the case may be, will disclose the estimated operating time required therefor. By comparison of the corresponding time graduations on the respective positive and negative carbon consumption indicators C and D as indicated by the needles 23, it can be determined if the remaining arc-carbon stubs are of sufficient length for operation of the chosen film reel, or if replacement thereof with new carbons is required.

Having fully described my carbon consumption indication and reel timer, what I claim as my invention and desire to secure by Letters Patent is:

A reel timer adapted for synchronizing the picture reel film within a supporting reel drum with the light arc-carbon units of a picture projector machine, and used therewith, comprising a rectangular base plate formed of dual transparent sections rigidly clamped together and formed with suitable mounting brackets at one end thereof for attaching to a reel drum, a slide bar fixedly mounted along one base plate side wall, parallel therewith, an indicator frame with needle, slidably mounted on said slide bar, an adjustable film detector rod rigidly mounted on said indicator frame and projected beyond the base plate section end for a predetermined length and engageable with the reel film surface, and time indicator scales mounted between the dual transparent base plate sections positioned parallel with the slide bar, said indicator scales being graduated to indicate "time durations" of the contacted moving picture reel film.

CARL MINGIONE.

References Cited in the file of this patent

UNITED STATES PATENTS

| Number | Name | Date |
| --- | --- | --- |
| 967,151 | Allen | Aug. 16, 1910 |
| 1,090,128 | Avers | Mar. 17, 1914 |
| 1,159,920 | Fretzdorff | Nov. 9, 1915 |
| 1,208,646 | Power | Dec. 12, 1916 |
| 1,235,785 | Fiskel | Aug. 7, 1917 |
| 1,538,510 | Bonk | May 19, 1925 |
| 1,583,656 | Chapman et al. | May 4, 1926 |
| 2,125,148 | Brenkert | July 26, 1938 |
| 2,224,728 | Gulliksen | Dec. 10, 1940 |